July 24, 1951

L. R. BUCKENDALE 2,561,335

CONICAL TRUSS DIFFERENTIAL CASE

Filed March 13, 1946

INVENTOR.
Lawrence R. Buckendale
BY
Strauch + Hoffman
ATTORNEYS

July 24, 1951  L. R. BUCKENDALE  2,561,335
CONICAL TRUSS DIFFERENTIAL CASE
Filed March 13, 1946  3 Sheets-Sheet 2
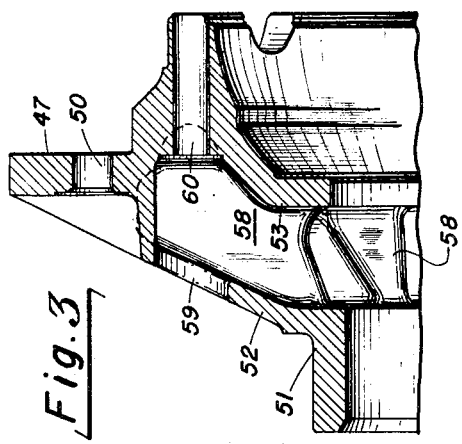
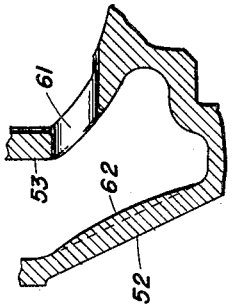
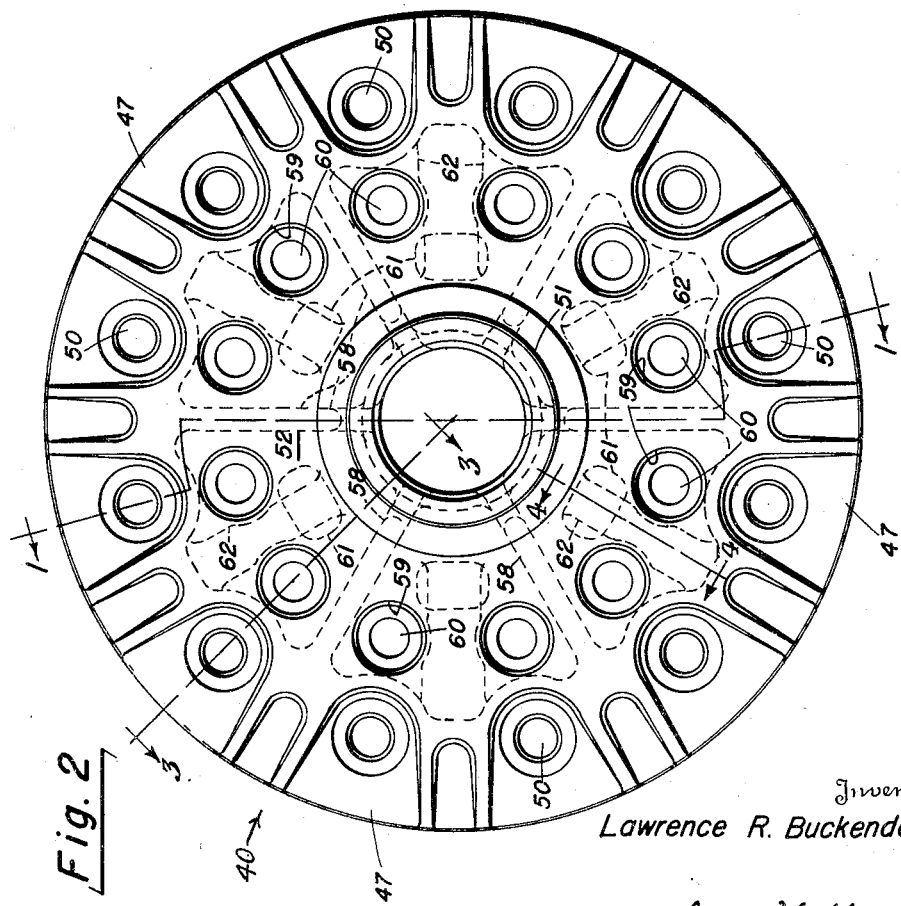
Inventor
Lawrence R. Buckendale
By Strauch + Hoffman
Attorneys July 24, 1951  L. R. BUCKENDALE  2,561,335
CONICAL TRUSS DIFFERENTIAL CASE
Filed March 13, 1946  3 Sheets-Sheet 3
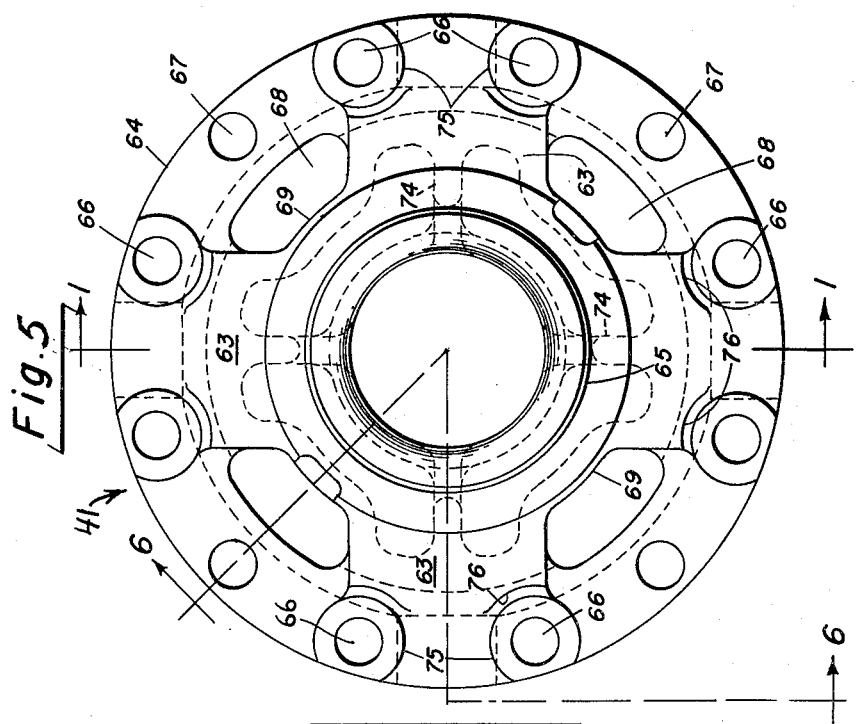
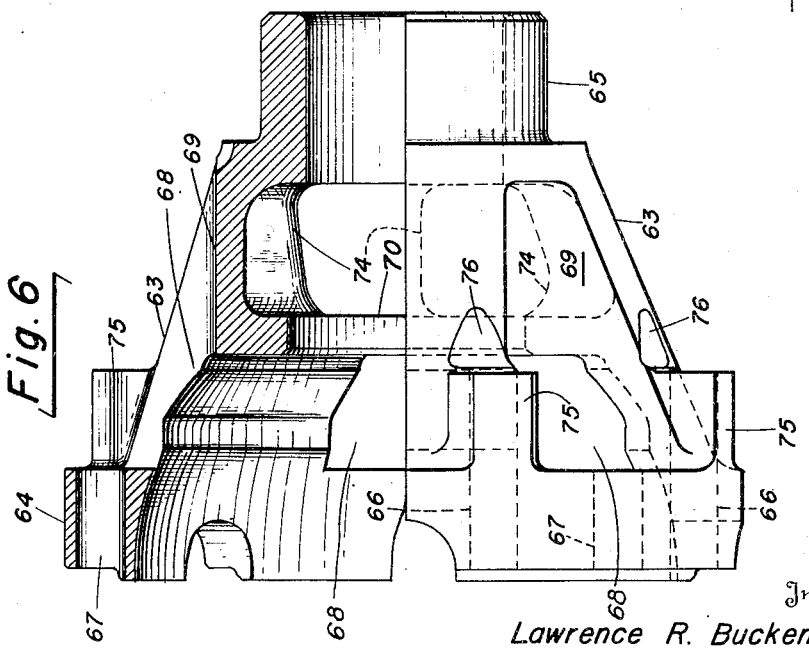
Inventor
Lawrence R. Buckendale
By Strauch + Hoffman
Attorneys Patented July 24, 1951

2,561,335

UNITED STATES PATENT OFFICE 2,561,335

CONICAL TRUSS DIFFERENTIAL CASE

Lawrence R. Buckendale, Detroit, Mich., assignor to The Timken-Detroit Axle Company, Detroit, Mich., a corporation of Ohio Application March 13, 1946, Serial No. 653,980

16 Claims. (Cl. 74—713)

1

This invention relates generally to differential drive axles and more particularly to an improved deflection resistant differential gear case construction.

In general the invention is concerned with making the best possible structural use of the metal available for the differential gear case while at the same time staying within the space limitations of the differential carrier or other axle housing parts. In the construction hereinafter described I provide a differential case having greater strength than hitherto conventional differential cases of equivalent mass, and as a corollary I am enabled to obtain strength equivalent to such conventional cases using a smaller mass of metal. I have discovered that arrangement of the mass of the differential case to provide a maximum of metal as nearly as possible in the direct path of drive thrust forces so as to take as much load as possible in compression, and as much as possible of the remainder in bending, while holding tension stresses in the case to a minimum, provides a novel and useful structure which represents an important part of this invention.

I have discovered in the preferred embodiment of the invention that the hitherto conventional external reenforcing ribs of such cases can be omitted and their function increased and built into the case itself by constructing the case in generally conical mutually bracing sections secured rigidly together with their external surfaces lying in opposed conical envelopes externally unencumbered by reenforcing ribs or like projections so as to take full advantage of the permissible space within the axle housing part. The mass of metal of my novel case may thus be arranged and disposed as far radially outwardly as possible so as to provide a maximum amount of it in the direct line of pinion drive thrust.

It is therefore the major object of my invention to provide a novel differential gear case construction wherein the mass of metal is so distributed as to afford maximum strength for a given amount of metal.

A further object of this invention is to provide a differential case having a conical truss construction wherein external reenforcing ribs are omitted and the mass of metal is arranged to place as much of it as possible in the path of the drive thrust forces.

Other objects will become apparent as the description proceeds in connection with the accompanying drawings, wherein:

2

Figure 2 is an end elevation of that section of the differential unit case shown to the left in Figure 1, and which carries the ring gear (omitted from Figure 2);

Figure 3 is a section substantially along the line 3—3 of Figure 2;

Figure 4 is a section substantially along the line 4—4 of Figure 2;

Figure 5 is an end elevation of that section of the differential unit case which mates with the section shown in Figure 2; and Figure 6 is a side elevation of the case of Figure 5, partly in section as indicated by the line 6—6 of Figure 5.

Figure 1:
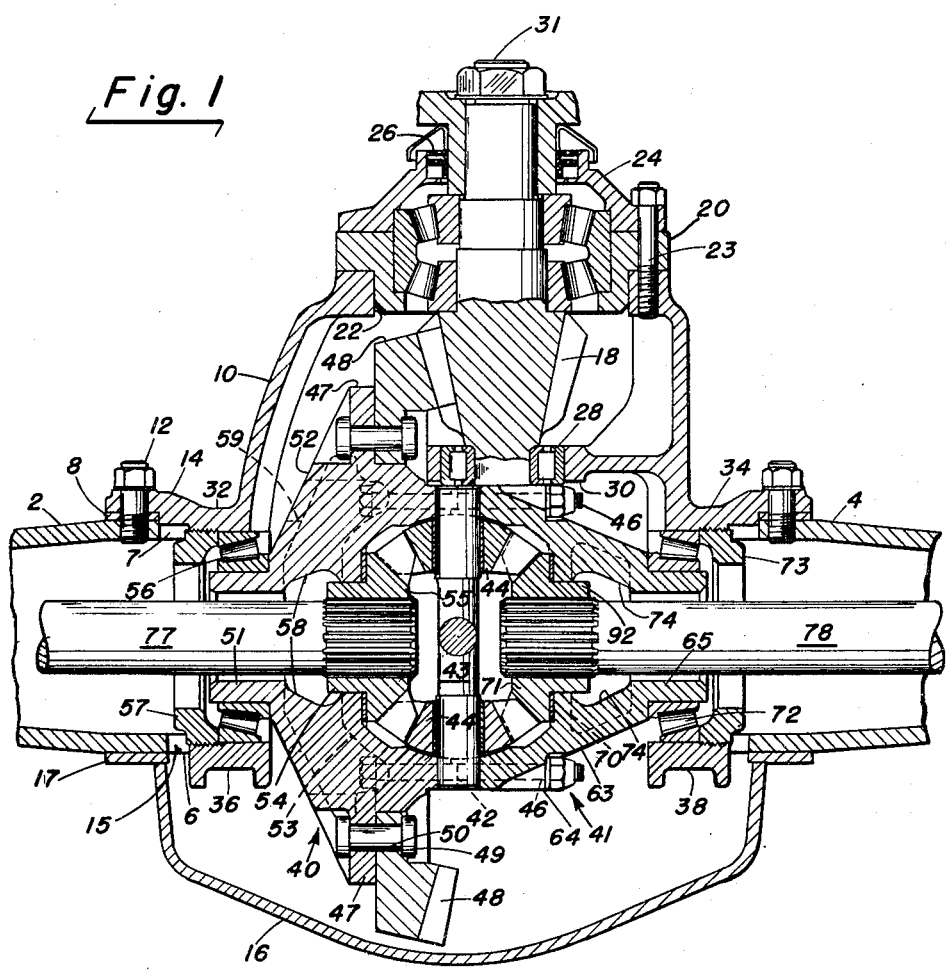
Figure 1 is a top plan view, in horizontal section, of a differential illustrating one embodiment of my invention, the plane of the section being indicated by the section lines 1—1 of Figures 2 and 5.

Referring now in further detail to the drawing for the purpose of illustration, oppositely extending axle housing arms 2 and 4 are integrally joined by a central enlarged housing portion 6 which is open front and rear so as to provide the well known banjo type axle housing. The front opening 7 of the housing is surrounded by a reinforced carrier attachment flange 8 to which a differential carrier 10 is secured by studs 12 cooperating with a flange 14 integral with said carrier. The rear opening 15 of the central housing portion 6 is closed by a bowl or cover member 16 provided with a marginal flange 17 welded to the housing portion 6.

An integral pinion and shaft 18 is journalled at one end in a bearing cage assembly 20 which is piloted in an aperture 22 at the front of the carrier 10 and is secured thereto by any conventional means such as studs 23, along with a cover 24 which contains a dust seal unit 26. The pinion and shaft 18 is journalled at its rear end in a bearing 28 supported in a suitable integral boss 30 extending from the side of the carrier 10. Secured to the forward and external end 31 of said pinion and shaft 18 is any conventional means for securing said end to a driven propeller shaft (not shown).

The carrier 10 has integrally formed at its sides a pair of aligned half cylindrical bosses 32 and 34, the rear halves of which are completed by identical half cylindrical caps 36 and 38 that are normally secured to the bosses 32 and 34 respectively by studs (not shown).

The differential unit includes a case for a spider, pinions and side gears comprising two opposed sections 40 and 41, respectively. The mating faces of the opposed case sections, indicated at 42, are recessed to receive the cylindrical outer ends of the four arms of a spider 43 upon which differential pinions 44 are freely rotatably mounted. The two case sections are rigidly secured in compression by twelve or some suitable number of bolts 46 in a circle, to retain and support the differential gearing in assembled relationship.

Case section 40 is of substantially greater outer diameter than any portion of the mating section 41, and is formed with a peripheral flange 47 to the inner side face of which a beveled ring gear 48 is secured as by rivets 49 passing through openings 50 in the flange. The flange 47 is connected to a hub 51 by a relatively steep conical wall 52 part of which lies directly in the projected path of the drive thrust area between the ring gear 48 and pinion 18.

Case section 40 also has an integral inner side wall 53 extending inwardly from the flange 47, and having a central opening in which the internally splined hub 54 of a differential side gear 55 is journalled. The wall 53 has an outer conical portion and an inner substantially radial portion as best seen in Figure 4. The hub 51 of the case section 40 is journalled in a suitable antifriction bearing 56 mounted in the half boss 3 and cap 36 and held against axial movement by a retaining member 57 threaded into said boss and cap.

A series of substantially equiangularly spaced internal radial ribs 58 are formed integral with wall 52, and they extend between the walls 52 and 53 as best shown in Figures 1 and 3, thus greatly strengthening the case section 40 to resist the thrust of the pinion 18 against the ring gear 48.

In order to provide for the insertion of the twelve bolts 46, and also to provide for access to their heads, the conical wall 52 has twelve cored holes 59 therethrough, in axial alignment with the drilled holes 60 (Figure 3) whereby the bolts 46 pass through the inner side wall 53. Referring to Figures 2 and 4, the inner side wall 53 is shown to be provided with passages 61 therethrough, there being one such passage between each two adjacent ribs 58, to provide means for fluid lubricant to enter from the axle housing into the chamber formed by the assembled case sections 40 and 41, and enclosing the pinion and side gears. As best shown in Figure 4, the conical outer wall 52 of case section 40 is thickened, as shown at 62, in those portions between the cored holes 59 and where there are no ribs 58. This further strengthens the conical wall 52.

Since case section 40 has no external ribs I am enabled to take full advantage of the available space within carrier 10 and so provide a relatively steep cone at 52 thereby concentrating a large part of the metal of case section 40 in the outer regions near the direct path of drive thrust from pinion 18 to ring gear 48, and the arrangement enables me to dispose the inner ribs 58 further outwardly toward that path than would be possible in the prior art, to the same advantage. The steepness of cone 52 is preferably such that its extended envelope will enclose ring gear 48 thus providing a compact thrust resistant assembly.

The case section 41 is provided with an external conical wall 63 connecting a cylindrical section 64 with a smaller hub 65. The cylindrical section 64 is the largest part of the case section 41 and has eight holes 66 therethrough. As shown in Figure 5 the holes 66 are disposed in pairs, the pairs being grouped 90 degrees apart. Between each pair of holes 66 is a hole 67, the holes 67 being 90 degrees apart. When the case sections 40 and 41 are assembled the holes 66 and 67 in case section 41 are in axial alignment with the twelve holes 60 in the case section 40.

The conical wall 63 is provided with four spaced apertures 68 to permit the entrance of lubricant into the assembled differential case, the apertures having the same angular disposition as the holes 67, as best shown in Figure 5. The conical wall 63 is depressed at each of the apertures as indicated at 69 to counteract the effect that a revolving conical surface would have in restricting the flow of lubricant through apertures 68. At the apertures 68 the cylindrical section 64 has a radial wall as shown in Figure 6. An inner wall 70 extends substantially radially inwardly and has a central bore providing a journal for the hub of the side gear 71. The hub 65 of case section 41 is journalled in an antifriction bearing 72 which is mounted in the half boss 34 and cap 38 and retained against axial movement by an annular member 73 which is threaded into the boss and cap. Internal rib members 74 between the inner wall 70, the conical wall 63 and the hub 65, strengthen the case section 41.

In order that the nuts on the bolts 46 will clear the exterior of the conical wall 63, the case member 41 is provided with bosses 75 at each hole 66, as best shown in Figures 5 and 6. Thus the holes 66 are substantially longer than the holes 67, and the bolts 46 passing through these holes will also be longer, by an equal amount. In order that socket wrenches may be used on the nuts for the bolts 46, the outer surface of the conical wall 63 may be slightly recessed adjacent each of the bosses 75 as indicated at 76 on Figures 3 and 6.

The axle shafts 77 and 78 have external splines cooperating with internal splines on the side gears 55 and 71 which thereby rotate the shafts.

From the foregoing description it will be apparent that there has been provided a two-section differential case wherein the rigidity for each section is obtained in large part from the conical wall of each respective section. A large part of the mass of metal of each case section is disposed as closely as possible in the path of thrust between the pinion and ring gear and the provision of internal ribs between the inner walls 53 and 70 and the associated conical exterior walls of each case section makes each section highly rigid and resistant to bending. The thrust load of the pinion 18 upon the ring gear is therefore taken partly in compression by the larger case section 40, and most of the remainder is absorbed in bending. By reason of the fact that the bolts 46 extend through a large portion of the length of the assembled case sections 40 and 41, a substantial portion of the smaller case section is under compression also, even when the assembled casing is under the thrust load imposed by the pinion 18.

My novel differential case thus comprises a pair of opposed substantially conical sections which are secured together to provide an assembly which has maximum resistance to axial bending, thereby retaining the alignment of bearings 56 and 72 during drive operation. The conical sections mutually brace each other, their internal ribs aiding in resisting axial bending of the assembled case, and the novel structure providing optimum stress distribution.

In the assembly internal radial ribs 58 and 74 of the respective case sections are preferably longitudinally aligned for optimum mutual bending resistance. Ribs 58 and 74 effectively provide conical truss members within the case sections.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a two piece differential case for an automotive vehicle; a first case section comprising a supporting hub, a spaced ring gear flange, a conical wall connecting said hub and flange, an integral inner wall spaced from said conical wall and having a central opening, and integral web members joining said hub, flange, conical wall and inner wall; a second case section having a cylindrical portion, a supporting hub, a conical wall joining said cylindrical portion and hub, an inner wall integral with said conical wall, spaced from the hub thereof, and having a central opening; and bolts passing through the inner wall of said first case section and the cylindrical portion of said second case section to clamp the two sections together, said conical wall of the first case section being provided with openings in alignment with said bolts to provide access to said bolts and also being thickened in those portions between the openings and web members.

2. In a two piece differential case for an automotive vehicle; a first case section comprising a supporting hub, a spaced ring gear flange, a conical wall connecting said hub and flange, and an integral inner wall spaced from said conical wall and having a central opening; a second case section having a cylindrical portion having a mating engagement with the inner wall of the first case section, a supporting hub for said second case section and a conical wall joining said cylindrical portion and hub, a series of angularly spaced bosses projecting from said cylindrical portion and beyond said conical wall to provide seats paralleling the plane of the joint between the first and second case sections; bolts passing through said cylindrical portion and bosses and the inner wall of said first case section, nuts on said bolts for clamping the case sections together, said seats providing proper engagement of the nuts or bolt heads with the outer surface of the second case sections, the conical wall of said second case section being provided with passages for lubricant and said cylindrical portion having a radial face at said passages, and clamping bolts passing through the cylindrical portion and the inner wall of said first case section at these points, the radial faces providing seats therefor.

3. A case section for a two piece differential case construction comprising a supporting hub, a spaced ring gear flange of substantially larger diameter than the hub, an integral conical wall connecting said hub and the outer periphery of said flange, and an integral inner wall connected to said flange in spaced relation to said conical wall, said inner wall having a substantially conical portion extending towards said hub and a substantially radial portion at the end of said conical portion having a central opening for journalling a side gear.

4. The case section described in claim 3 wherein a series of angularly spaced radial ribs are integral with and extend between said conical wall and said inner wall, and wherein said conical wall is thickened in those portions between the ribs.

5. A case section for a two piece differential case construction comprising a supporting hub, a spaced hollow cylindrical portion of substantially larger diameter spaced from and coaxial with said hub, a conical wall joining said cylindrical portion and hub, a series of angularly spaced bosses projecting from said cylindrical portion and beyond said conical wall to provide radial seats, said bosses having central passageways for bolts or the like and means providing lubricant passages in said conical wall, said cylindrical portion having a radial face at said passages and also having openings for fastening elements normal to said radial face.

6. The device described in claim 5 wherein an inner wall having a central opening is provided integral with and extending substantially radially from said conical wall to support a side gear, and a series of angularly spaced ribs integral with and connecting said conical and inner walls.

7. In a differential case section, an external generally conical wall having no external reinforcing ribs, an integral internal wall axially spaced from said external wall having a conical portion extending in the direction of said external wall and having a terminal portion apertured to provide a journal for a differential side gear, a ring gear attachment flange surrounding and integrally joining the outer peripheries of said walls, said internal wall having a plurality of spaced bolt receiving openings for attachment of the case section to another differential case section, and longitudinally extending circumferentially spaced internal ribs within said case section integrally interconnecting said conical wall and said internal wall said conical wall being provided with apertures for access to bolts in said openings.

8. In a differential case section, an external wall surface lying in a substantially conical envelope and having no external reenforcing ribs, a hub integral with the smaller end of said wall, a ring gear secured to said case section adjacent the base of said external wall, said ring gear lying within the projected envelope of said external wall surface, an internal differential side gear supporting wall integral with said case section and extending from said base toward said hub and terminating in a portion having a side gear receiving opening disposed axially outwardly of said ring gear, and integral longitudinally extending internal reenforcing ribs joining the interior of said external wall to said internal wall.

9. In a differential case assembly, two case sections each having external walls with their outer surfaces lying in substantially conical envelopes and having no external reenforcing ribs, means securing said case sections together at their larger ends, intermediate internal walls in each of said sections centrally apertured to provide supports for the differential side gears, and circumferentially spaced longitudinal reenforcing webs in each of said case sections between the external and internal walls in each section.

10. In the differential case assembly defined in claim 9, said webs in the respective case sections being longitudinally aligned when the case sections are secured together.

11. In a differential assembly, two case sections each having their external wall surfaces lying in substantially conical envelopes with no external reenforcing webs, means for securing said case sections together at their larger ends, a ring gear attachment flange integral with one of said case sections and encompassed by the projected envelope of the associated external wall surface of said one case section, and a plurality of circumferentially spaced axially extending integral reenforcing ribs within each of said case sections to mutually brace the assembly against bending.

12. In a differential assembly, a first case section having at opposite ends a supporting hub and a larger attachment rim, an integral wall joining said hub and rim and having its external surface free of reenforcing ribs and lying in a substantially conical envelope flaring from said hub, a ring gear attachment flange of larger diameter than said rim integral with said wall and a ring gear thereon both lying substantially within the extended envelope of said surface, a plurality of axially extending internal reenforcing ribs within said case section integral with said wall, said wall being of relatively steep slope with respect to the hub for disposing an appreciable amount of metal of said casing section outwardly at the periphery of said case section so as to provide optimum direct backing for the ring gear against thrust forces that arise when the ring gear is driven by the usual drive pinion, a second case section having a rim secured to the rim of said first case section and a smaller axially spaced hub, an external wall integrally joining the hub and rim of said second case section and having its external surface free of reenforcing ribs and lying in a substantially conical envelope, and a plurality of axially extending internal reenforcing ribs integral with said second casing section wall.

13. In the differential assembly defined in claim 10, a radially extending internal wall within each of said case sections intermediate the hub and rim and apertured for journalling side gears of the differential, and said reenforcing ribs in each case section extending between the external and internal walls.

14. In a differential assembly, a casing section having an outer conical wall free of external reenforcing ribs, the outer periphery of said wall providing a ring gear attachment flange, a hub integral with the other end of said wall, an integral internal wall inwardly of said flange having in succession a radial bolting face, an inclined portion sloping toward the hub and a centrally apertured radial portion, and integral reenforcing ribs connecting the hub and both walls.

15. In a differential case assembly, two case sections each having hubs and larger mated attachment faces at opposite ends and integral external substantially conical walls constructed and arranged for disposing the mass of said case sections mainly at the periphery of said assembly, means for securing said case sections together at said mated attachment faces, a ring gear secured about and upon one of said case sections radially outwardly of said attachment faces but lying within the projected envelope of the external conical wall of said one case sections, and a series of circumferentially spaced longitudinally extending reenforcing ribs within each case section for mutually bracing the assembly against axial bending.

16. A case section for a two piece differential case construction comprising a supporting hub, a spaced ring gear flange of substantially larger diameter than the hub, an integral conical wall connecting said hub and the outer periphery of said flange, an integral inner wall connected to said flange in spaced relation to said conical wall, said inner wall having a substantially conical portion extending toward said hub and a substantially radial portion at the end of said conical portion having a central opening for journalling a side gear, and a plurality of spaced radial ribs internally joining said conical wall with said hub, flange and inner wall radially outwardly of said opening.

LAWRENCE R. BUCKENDALE.

REFERENCES CITED

The following references are of record in the file of this patent:

UNITED STATES PATENTS

| Number | Name | Date |
| --- | --- | --- |
| 1,226,742 | Baker | May 22, 1917 |
| 1,987,716 | Skelton | Jan. 15, 1935 |
| 2,056,881 | Alden | Oct. 6, 1936 |
| 2,133,112 | Ormsby | Oct. 11, 1938 |
| 2,183,667 | Buckendale | Dec. 19, 1939 |
| 2,219,025 | Vandenberg | Oct. 22, 1940 |